(12) United States Patent
Hayes et al.

(10) Patent No.: US 10,175,718 B2
(45) Date of Patent: Jan. 8, 2019

(54) USER INTERFACE FOR POWER QUALITY MONITORING AND MEASURING DEVICES

(71) Applicant: ASCO Power Technologies L.P., Florham Park, NJ (US)

(72) Inventors: John E. Hayes, Hardwick, NJ (US); Christian G. Hess, Kinnelon, NJ (US)

(73) Assignee: ASCO Power Technologies, L.P., Florham Park, NJ (US)

( * ) Notice: Subject to any disclaimer, the term of this patent is extended or adjusted under 35 U.S.C. 154(b) by 713 days.

(21) Appl. No.: 14/927,063

(22) Filed: Oct. 29, 2015

(65) Prior Publication Data

US 2016/0370824 A1 Dec. 22, 2016

Related U.S. Application Data

(63) Continuation of application No. 14/741,486, filed on Jun. 17, 2015.

(51) Int. Cl.
| | |
|---|---|
| *G06F 1/16* | (2006.01) |
| *H05K 5/00* | (2006.01) |
| *H05K 7/00* | (2006.01) |
| *H02J 13/00* | (2006.01) |

(52) U.S. Cl.
CPC ............. *G06F 1/16* (2013.01); *H02J 13/001* (2013.01); *Y02E 60/74* (2013.01); *Y04S 10/30* (2013.01); *Y04S 10/40* (2013.01); *Y04S 10/527* (2013.01)

(58) Field of Classification Search
CPC ........ H02J 13/001; Y04S 10/30; Y04S 10/40; Y04S 10/527

USPC .............. 361/679.21–679.3, 679.55, 679.56, 361/679.01, 679.02; 349/56–60
See application file for complete search history.

(56) References Cited

U.S. PATENT DOCUMENTS

| | | | |
|---|---|---|---|
| 7,911,779 B1* | 3/2011 | Tarnoff ................ | G06F 1/1626 361/679.43 |
| 8,526,176 B2* | 9/2013 | Clark .................. | A61B 5/0002 248/918 |
| 2010/0053882 A1* | 3/2010 | Hayashi ................ | B60R 11/02 361/679.43 |
| 2010/0195279 A1* | 8/2010 | Michael ............... | G06F 1/1632 361/679.41 |
| 2011/0188197 A1* | 8/2011 | Jackson .................. | H05K 5/00 361/679.41 |
| 2013/0050932 A1* | 2/2013 | Williams .............. | G06F 1/1632 361/679.41 |
| 2013/0107446 A1* | 5/2013 | Carnevali ............. | G06F 1/1632 361/679.43 |
| 2014/0168885 A1* | 6/2014 | Williams .............. | G06F 1/1632 361/679.43 |
| 2015/0124395 A1* | 5/2015 | DeSilva ................ | G06F 1/1632 361/679.41 |
| 2015/0286251 A1* | 10/2015 | Emslie .................. | G06F 1/1632 361/679.41 |
| 2016/0161989 A1* | 6/2016 | Prejer ................. | B60R 11/0252 361/679.41 |

* cited by examiner

*Primary Examiner* — Anthony M Haughton
(74) *Attorney, Agent, or Firm* — McDonnell Boehnen Hulbert & Berghoff LLP (57) ABSTRACT

A user interface for electrical components, such as a transfer switch, is presented having a first part mounted to an electrical enclosure and a second part that is removable from the first part without accessing the electrical enclosure or disconnecting power from the electrical components within the enclosure.

19 Claims, 6 Drawing Sheets

USER INTERFACE FOR POWER QUALITY MONITORING AND MEASURING DEVICES

CROSS REFERENCE TO RELATED APPLICATIONS

The present application is a continuation application of U.S. patent application Ser. No. 14/741,486, filed Jul. 17, 2015, which claims the benefit of U.S. Provisional Patent Application No. 62/038,676 filed Aug. 18, 2014 and also claims the benefit of U.S. Provisional Patent Application No. 62/097,642 filed Dec. 30, 2014 the entire contents of which are incorporated entirely herein by reference.

BACKGROUND

Unless otherwise indicated herein, the materials described in this section are not prior art to the claims in this application and are not admitted to be prior art by inclusion in this section.

The present disclosure relates generally to devices and systems for power monitoring, control and measurement to prevent power interruptions or improve power quality through the use of an operator computer controlled interface. More specifically, this application concerns devices and methods that allow for the safe repair and/or replacement of electrical equipment, such as transfer switch interfaces, without requiring disconnection of power.

BACKGROUND

Power quality measuring and monitoring is an important concept in the power industry and generally relates to devices, methods and systems that ensure that an AC power system is consistent, free from harmonic content and/or remains uninterrupted. For example, a power quality meter is one type of device that can give some form of harmonic content indication. Another example of a power quality and monitoring device is a power transfer switch that is used to switch electrical loads between two independent sources of power so as to prevent disruption in service. A principal goal of a power transfer switch system is to ensure that the electrical load is supplied with an acceptable source of power at a high rate of availability and to minimize load disruptions.

The above devices and systems are normally located in housings for enclosing and protecting the electrical equipment from hostile environments from rain, snow, insect damage, animal damage, human tampering, and so forth. Typically these electrical enclosures have a front panel with portions having cut outs to expose one or more current meters, volt meters, circuit breakers, disconnects, switches, push buttons, and the like that must be mounted inside to the backside surface of the flat panel and hardwired amongst the various transfer switch components. In order to replace or service these fixed mounted interfaces, a trained service operator must typically open the electrical enclosure via a service entrance and perform servicing work from within the inside the enclosure. Because of the risks of electrical shock and arc flash, especially if the electrical equipment comprises medium voltage or high voltage transfer switches, all sources of electrical power must be disconnected from the equipment housed inside the electrical enclosure. In modern transfer switch systems, for example, the user interfaces are typically integrated electronic assemblies presented to the user through the cutout in the electrical enclosure, and is interconnected by hard wiring to other devices within the electrical enclosure housing the transfer switch. In such systems, in order to reduce the dangers of electrical shock or arcing, servicing of the user interface requires that the power to the transfer switch be disconnected. This disconnecting of the power can result in extended periods without electrical power. This is true regardless of whether the maintenance work is to be performed on the high voltage switching mechanism or the low voltage control circuits of the switch interface itself.

As such, there is a need in the power quality measuring and monitoring technology field for a user or operator interface that avoids these dangers. The interface must be serviceable or capable of replacement or expansion without the loss or interruption of existing service. The present disclosure, although generally applicable to a number of power quality and monitoring systems, finds specific applicability with respect to transfer switch systems by avoiding the need to disconnect the power to the transfer switch while allowing maintenance of the user interface. Additionally, the present disclosure provides a method for replacing the user interface without the need for disconnection of the power load to the transfer switch. These and other benefits of the presently disclosed systems and methods will become more evident from a reading of the following description and a review of the attached drawings.

SUMMARY

The present system and methods are advantageous in that they allow servicing or replacement of a user interface for power quality measuring and monitoring systems, specifically transfer switch systems, without the need to disconnect or interrupt the AC power or to open up the electrical enclosure that houses the transfer switch. Requiring the operator to open and enter the electrical enclosure exposes the operator to electrical shock or arcing. Before our disclosed system and method, it was typically necessary to interrupt power and open electrical enclosures in order to service or replace user interfaces. This resulted in system down time and added cost. The present systems and methods reduce these prior existing problems by using a modular or multiple part interface system where one part is easily disconnected both electrically and mechanically from a second fixed or mounted part of the interface system without needing to disconnect or interrupt AC power or exposing an operator to electrical shock. In most cases, replacement of the interface can take a matter of several minutes.

Accordingly, one disclosed embodiment is directed to a user interface for a power quality measuring or monitoring device having at least two parts where one part is easily removable both electrically and structurally from the other part that is fixedly secured to an electrical enclosure front panel. The fixed and secured first part of the interface can include a box portion that projects backwards into the electrical enclosure. Preferably, this first part is composed of two parts that fit together with connectors. This first part has rear side and sidewalls that define the box portion. A front panel forms the second portion of the first part and has one or more flange surfaces that allow connectors to secure or mount the first part to the backside of the front panel of the electrical enclosure. The first part also has one or more bracket slots that accept distal ends of one or more swing brackets attached to the second part of the interface. A preferred size of the box portion of the first part does not exceed 12 in.×8 in.×5 in.

The box portion of the first parts contain the electrical components necessary to measure, monitor, control and/or operate the electrical equipment contained with the electrical enclosure and to power the interface. In the specific case of transfer switch systems, it is preferable that the interface box contains a circuit board, a computer comprising a central processing unit (CPU), and memory that are all in electrical communication with each other. The second part of the user interface is removably connected to the first part. This removable second part has a front side and a backside supporting one or more swing brackets, each bracket having a distal end and a proximal end. The proximal end is preferably removably engaged with a bracket connection on the backside of the second part such that swing bracket can be removed without the use of hand tools, such as, screwdrivers, pliers, wrenches, or power assisted hand tools. Preferably, the proximal end of the swing bracket is disconnected from the bracket connection on the backside of the second part of the interface by disengaging a snap or compression fit connection. Bending or flexing the bracket transversely inward relative to the backside of the second part to unclip or disengage it from the bracket connector can achieve disconnection.

The distal end of the swing bracket is configured to be inserted into and to fit inside the bracket slot on the front panel of the first part such that the second part of the interface can swing or rotate downward and away from the front panel from a vertical closed position to an open position while remaining connected to the first part. Preferably, the swing brackets allow the second part to rotate downward at an angle of at least 90 degrees. The bracket slot is configured with an enlarged upper open portion that allows the distal end of the bracket to be inserted into the slot. The lower section of the slot is sized with an opening that allows the middle portion of the swing bracket to swing freely. The distal end of the bracket preferably has an enlarged portion that is larger than the lower opening in the slot such that the bracket cannot be pulled out of the slot. To remove the second part from the first part, the second part is moved from the vertical closed position and lifted vertically relative to the first part such that the distal end of the swing bracket aligns with the enlarged or wider portion of the slot. Once aligned, the second part is then moved away from the front panel of the first part until the distal end of the swing bracket is no longer within the bracket slot. To completely remove the first part from the second part, the removable electrical cable as described below must be disconnected.

The removable electrical connection between the first part and the second part provides an electrical interface designed to provide power and electrical signals between the two parts of the user interface, and can be reused when future adaptations of either the first or second part of the interface are made. This electrical interface provides low voltage power to the second part to power and communicate electrically with the display, push buttons, Ethernet ports and USB connections that are located on a front side of the second part and that are user accessible from outside an electrical enclosure. Preferably, this low voltage power is in the range from about 12 to 32 Vdc and consumes a maximum power of 30 W or less. The preferred removable electrical connector comprises a ribbon cable that terminates in one or more plugs or terminal blocks that can be unplugged by an operator without the need to use hand tools as defined above. Accessibility to the electrical connector for disconnection is possible when the second part is moved or opened from the closed vertical position. Concerning the particular interface display, a preferred display is a color touch screen at least 7 inch measured diagonally and in electrical communication with the CPU. The display preferably utilizes a 5-wire resistive touch screen.

When the second part is in the closed positioned, it is preferable to use one or more locks to releasably secure the second part to the first part. Such locks can be locked and unlocked using a hand tool or designed with connectors that do not require the use of a hand tool. The locks can be covered by end caps that removably attach through snap or compression fittings on the edges of the front side of the second part. These end caps are removed or popped off by an operator to expose and gain access to the locks when service or replacement of the interface is needed.

The electrical components located in the box portion of the first part of the interface are connected via hard wiring to a low DC voltage power source and to certain electrical equipment within the electrical enclosure, such as, for example, one or more transfer switch assemblies. The electrical components in the box can also include one or more Ethernet connections, a Wi-Fi component, USB connections, and/or Bluetooth components. The second part likewise can connect with the Ethernet and USB components through the removable electrical connection such that the second part is in electrical communication with the CPU. The USB ports shall be capable of off loading files from the interface, uploading new or revised software to the interface, and providing for the use of a keyboard and mouse. The USB ports preferably are capable of interfacing to standard USB connectivity devices, such as Ethernet, Wi Fi or Cellular adapters. The front side of the second part also preferably has one or more push buttons, with one of those buttons being a reset switch that can be used so that the CPU can be reset from the front of the user interface. The reset button can be recessed to prevent accidental actuations.

Preferably the user interface is accessible by an operator positioned outside the electrical enclosure. Most preferably, the second part and the attached display are positioned such that they are generally flush with the front surface of the flat front panel of the electrical enclosure. The interface also can have a real time clock and a lithium battery to maintain the real time clock when external DC power is disconnected. It also advantageous to include circuitry that allows the user interface to generate an alarm signal either visually, audibly, through email, text message or a combination of these to notify the operator a problem exists.

These and other embodiments will become more apparent from a detailed description presented below.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
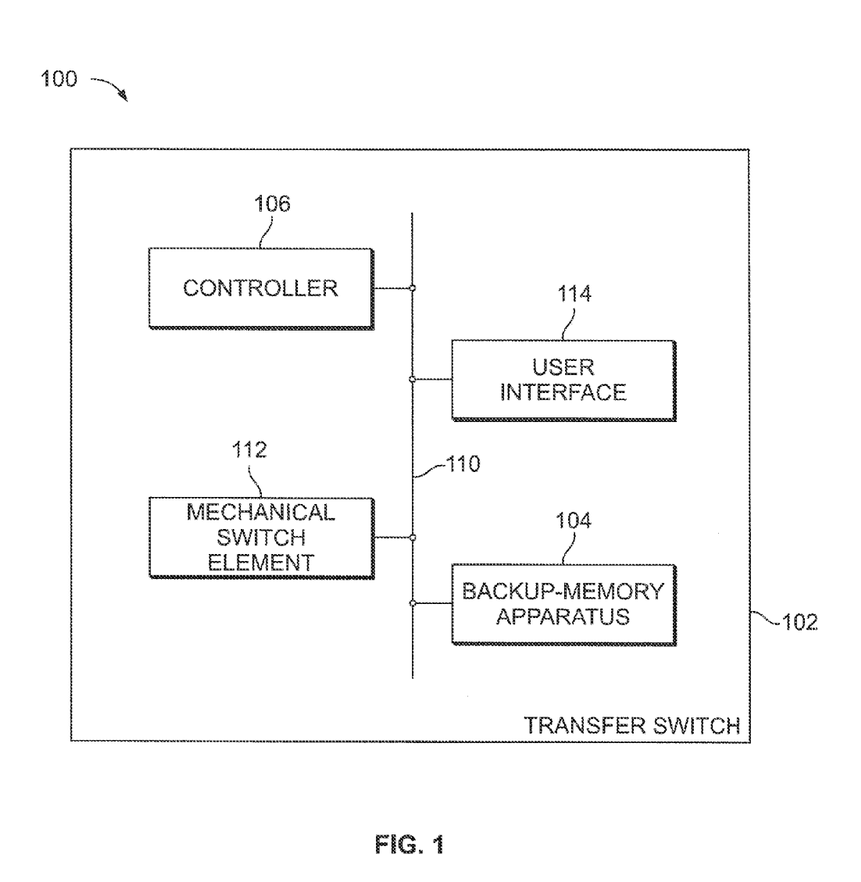
FIG. 1 is a simplified block diagram of a transfer-switch system in which the proposed two-part user interface methods and systems can be implemented.

FIG. 1 is a simplified block diagram of a transfer-switch system in which the proposed two-part user interface methods and systems can be implemented. It should be understood, however, that numerous variations from the arrangement and functions shown are possible while remaining within the scope and spirit of the claims. For instance, elements may be added, removed, combined, distributed, substituted, re-positioned, re-ordered, or otherwise changed. Further, where this description refers to functions being carried out by an entity such as a user interface or transfer-switch controller, it will be understood that the entity can carry out the functions by itself or with the assistance of other entities, and through application of hardware, firmware and/or software logic. For instance, the entity may include a processor programmed with instructions to implement the functions described. Still further, it should be understood that all of the discussion above is considered part of this detailed disclosure.

The transfer-switch system 100 includes a transfer switch 102 that, for example, functions as a switch between its primary power source and a backup, standby power source. The transfer switch 102 includes a mechanical switching mechanism 112. The mechanical switching mechanism 112 may be configured to operate automatically or manually or a combination of automatic and manual operation. The switch mode of the mechanical switching mechanism 112 may be Open Transition (OT) or Closed Transition (CT).

The transfer switch 102 also includes a user interface 114, a backup-memory apparatus 104, and a transfer-switch controller 106. The user interface 114, mechanical switching mechanism 112, the memory apparatus 104 and the switch controller 106 may be coupled together by a system bus or other mechanism 110. In one such alternative mechanism, a wireless data channel may be provided. As will be described in greater detail below, the user interface 114 allows the operator of the transfer switch system 100 to operate, monitor, and/or obtain operating data and other relevant system information directly from a front panel of an enclosure containing the transfer switch 100.

The user interface as presently disclosed will now be further described by reference to the accompanying drawings. One of many possible embodiments will be described; however, this embodiment, which is specific to a transfer switch system, shall by no means be construed as limiting the many possible variations in design of each of the components of our invention.

Figure 2:
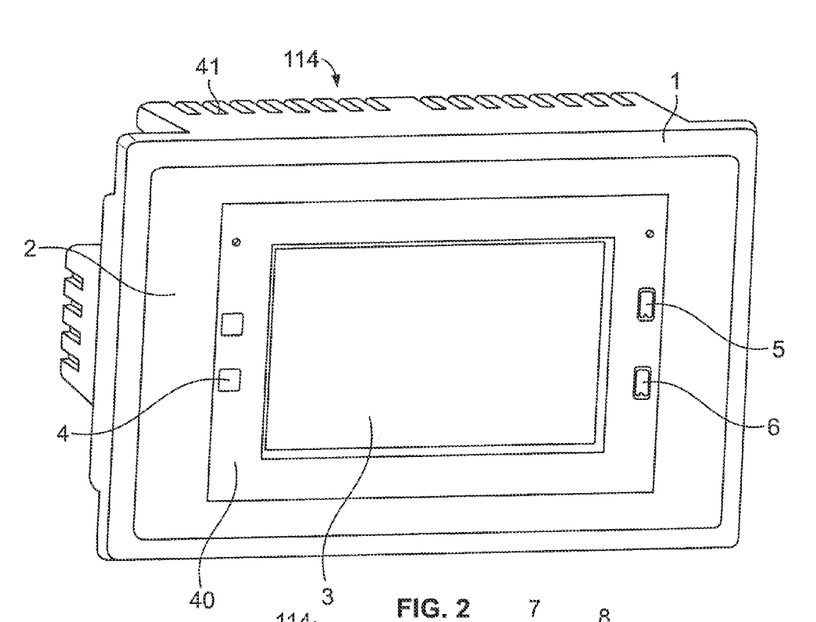
FIG. 2 illustrates a perspective front view of one embodiment showing the two parts of the user interface before installation in an electrical enclosure and where the second part is in the vertical closed position.

Turning first to FIG. 2 there is shown the user interface 114 before it is mounted to the backside of the front panel of an electrical enclosure. The interface comprises a first part 1 and a second part 2. The second part 2 has a front side 40 that has a display 3, a USB connection 5, an Ethernet port 6, and push buttons 4 that are all accessible by an operator when positioned outside of the electrical enclosure. The first part comprises a box portion 41 that holds various electrical components, such as a CPU, circuit boards, and memory. (see e.g., FIG. 9). FIG. 2 shows the second part of the user interface in a vertical closed position.

Figure 3:
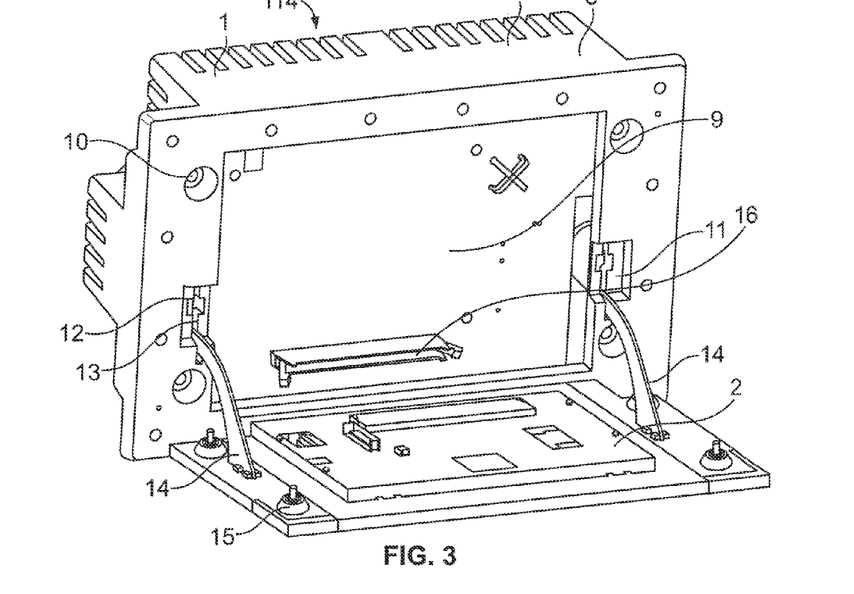
FIG. 3 illustrates a perspective front view of the embodiment of FIG. 2 where the second part is in the open position and supported by the swing brackets.
Figure 7:
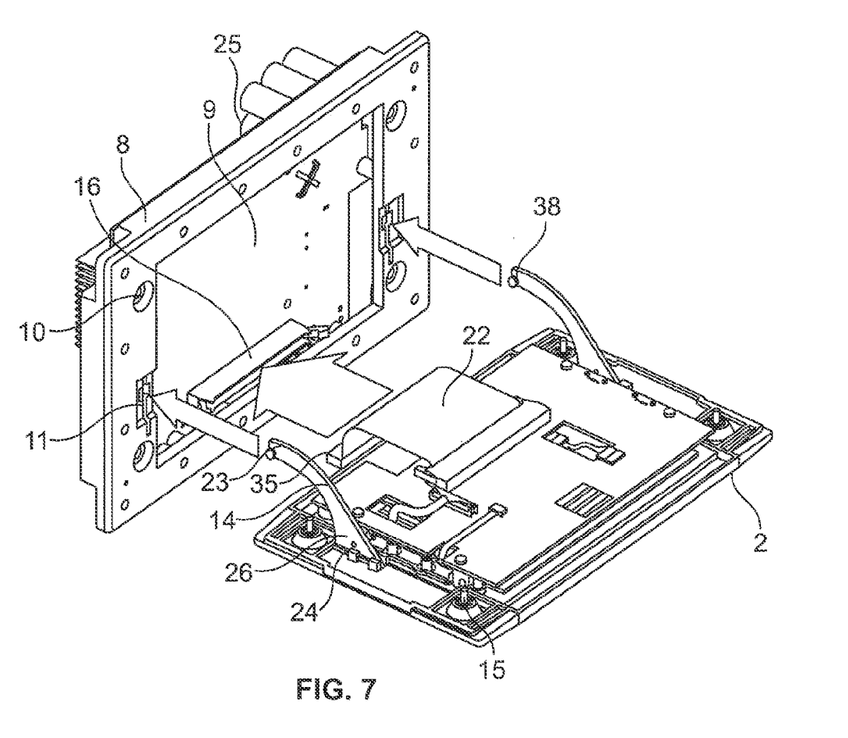
FIG. 7 illustrates a perspective front view of the embodiment of FIG. 2 where the box portion of the first of the user interface is not shown and the electrical components are exposed.

FIG. 3 shows the user interface 114 where the second part 2 is in an open position where swing brackets 14 support and hold the second part 2 at an angular position of about of 90 degrees relative to the first part 1. In other words, an operator has disengaged locks 10 and 15 and the second part 2 has been subsequently pulled downward from the vertical closed position causing the swing brackets 14 to pivot outwardly from within bracket slots 11. Bracket slots 11 have enlarged openings 12 in the upper portions of the slots and a narrow openings 13 in the lower portions of the slots 11. Swing bracket 14 has a distal portion 23 and a proximal portion 26. (see e.g., FIG. 7). The distal portion is configured and sized to fit into the enlarged portion 12 of slot 11, but is prevented from disengaging from the slot in lower portion 13, thus providing support for the second part 2 when in the open position as illustrated in FIG. 3. The distal end of swing bracket 14 may comprise pins or other protrusions 38 that may be configured to project outwardly from the distal end a distance greater than the opening in the lower portion 13 of slot 11. As mentioned, the first part 1 has at least two removable portions 7 and 8. Portion 7 is a box that holds electrical components that are electrically connected through the removable connector 22 shown in FIG. 7 shown as a ribbon wire or harness. This ribbon connector releasably connects to terminal block 16 that is mounted on circuit board 9 that is fastened to portion 8 of the first part 1.

Figure 4:
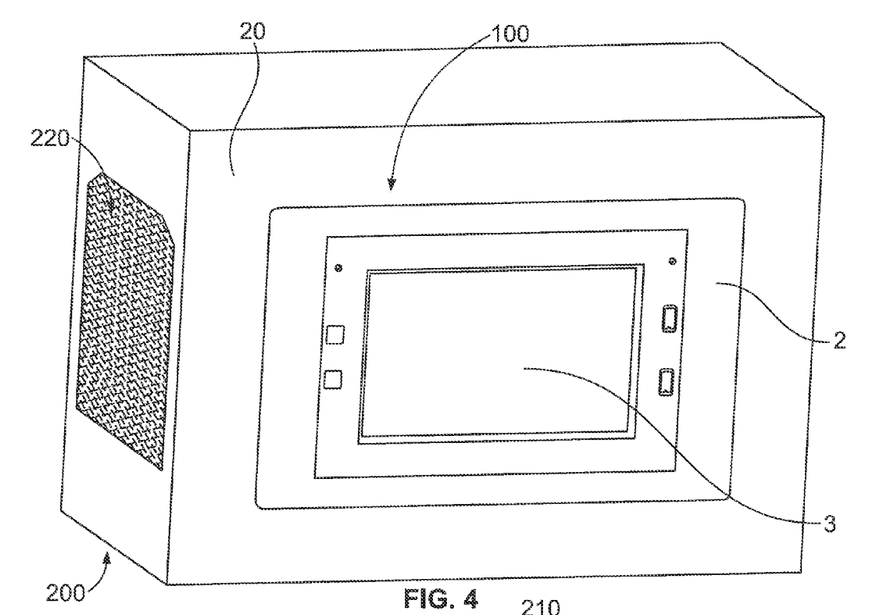
FIG. 4 illustrates a perspective front view of the embodiment of FIG. 2 where the user interface is mounted to the front flat panel of an electrical enclosure and the second part of the interface is in the vertical closed position.
Figure 5:
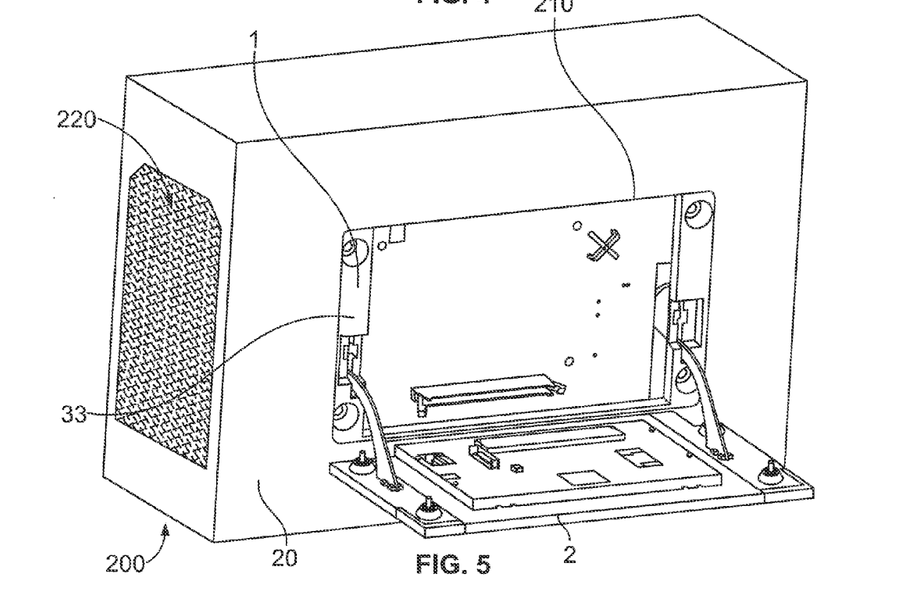
FIG. 5 illustrates a perspective front view of the embodiment of FIG. 2 where the user interface is mounted to the front flat panel of an electrical enclosure and the second part of the interface is in the open position.
Figure 6:
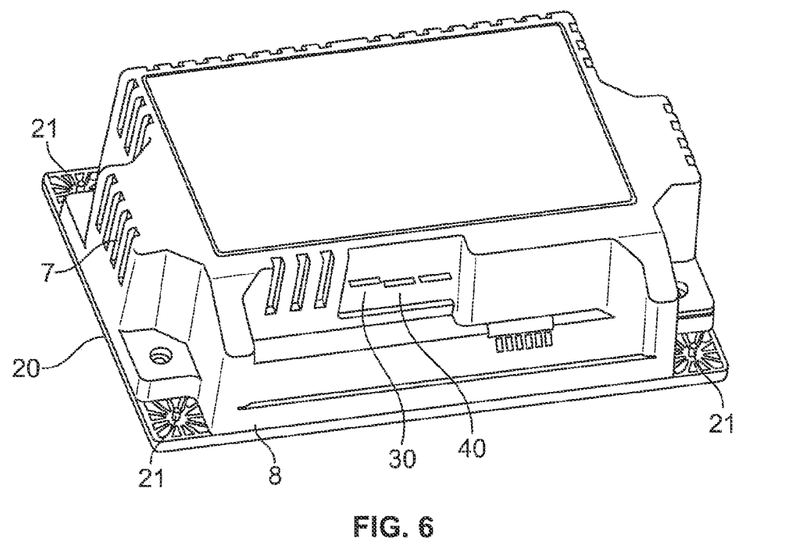
FIG. 6 illustrates a perspective rear view of the embodiment of FIG. 2 where the user interface is shown mounted to the backside of the front flat panel of an electrical enclosure.

FIGS. 4 and 5 show the user interface 114 mounted to a flat front panel 20 of an electrical enclosure 200 in both the closed position and the open position (FIG. 5). Preferably, the electrical enclosure 200 comprises an enclosure for housing a transfer switch. As illustrated, the front panel 33 is exposed and accessible through cutout 210 in the front panel 20 of the electrical enclosure 200. As FIG. 4 shows, when the second part 2 of the interface is in the closed position the front side of the second part 2 including display 3 is general flush with the front panel 20 of the electrical enclosure and accessible by an operator using the interface 100. FIG. 5 shows that the first part 1 is flush mounted to the backside of the flat front panel 20 of the electrical enclosure such that the box portion 7 projects or extends rearward into the enclosure. FIG. 6 illustrates this rearward projection of box portion 7. Portion 7 of the first part 1 is attached to the backside of panel 20 through connectors 21. Box portion 7 also may comprise USB connections 30 and an Ethernet port 40 that allow electrical connectivity and communication with other electrical components housed within the electrical enclosure 200, such as the typical components of a transfer switch 220.

Figure 8:
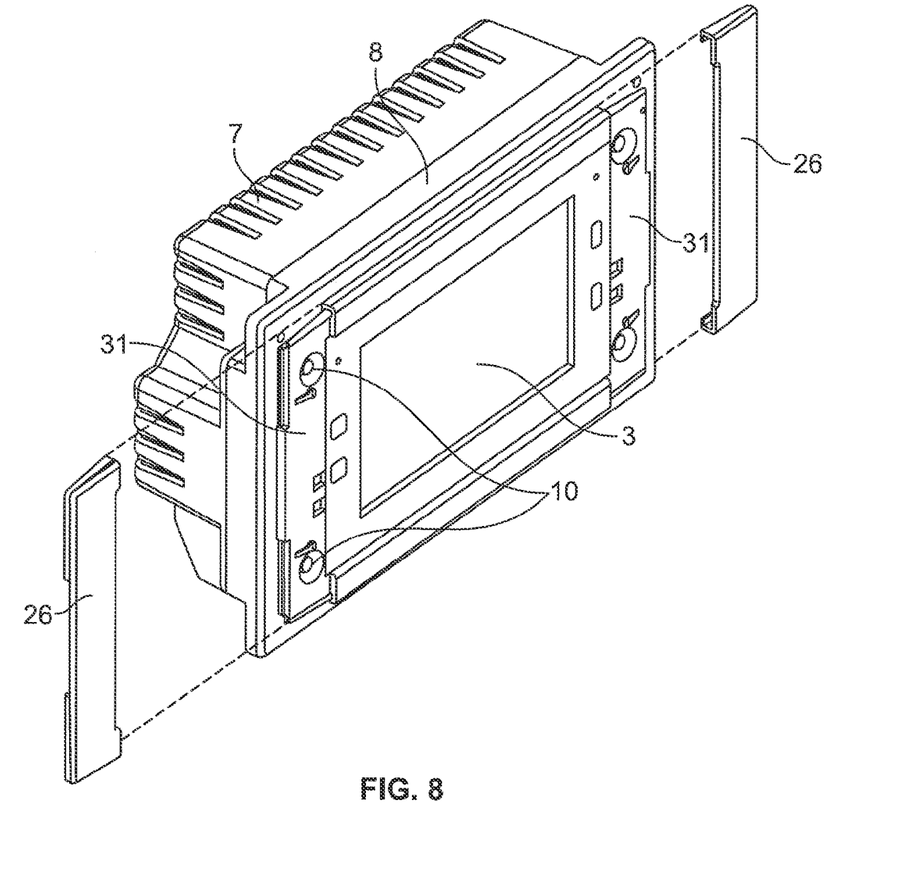
FIG. 8 illustrates a perspective front view of the embodiment of FIG. 2 showing the end caps removed that cover the locks that secure the second part in the vertical closed position.
Figure 9:
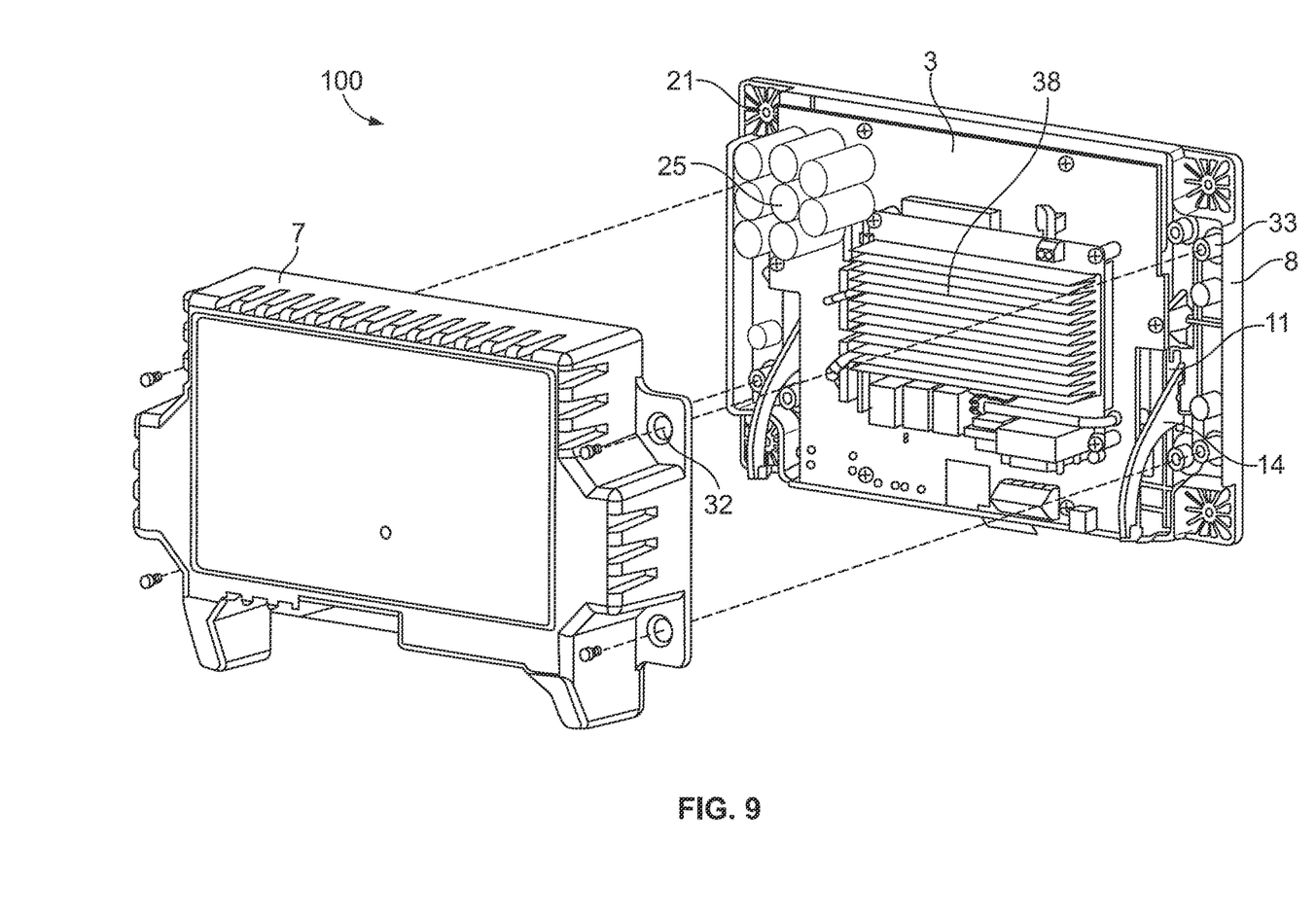
FIG. 9 illustrates a perspective rear view of the embodiment of FIG. 2 where the box portion of the first part of the user interface is shown removed exposing the electrical components contained therein.

FIG. 7 illustrates the first part 1 and second part 2 in a disconnected state. Swing brackets 14 are connected to bracket connection 24 and terminal block 35 and ribbon connector 22 is disconnected from terminal block 16 which is fixed to circuit board 9. Circuit board 9 is attached to portion 8 of the first part 1. Box portion 7 is not shown as it is removed from portion 8 thus exposing electrical components 25. FIG. 8 shows the user interface in the closed position with end caps 26 removed from front surfaces 31 on the front side of the second part. End caps 26 are configured as removable covers that are attached through snap or compression connectors to flange surfaces 31 such that the locks 10 are covered. FIG. 9 shows the box portion 7 removed from portion 8 of the first part of the user interface thereby exposing electrical components 25 and 38. The box portion 7 is attached to portion 8 through connectors 32 and 33. FIG. 9 also illustrates the projection of swing bracket 14 through slot 11 of portion 8 and into box portion 7.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

We claim:

1. A user interface for power quality measuring or monitoring devices comprising:
   a first part comprising a box portion and a front panel, wherein the front panel comprises a bracket slot and flange surfaces containing mounting connectors configured to allow the first part to be secured to an electrical enclosure; and
   a second part removably connected to the first part, wherein the second part comprises a front side and a backside, the backside comprising a swing bracket having a proximal end removably engaged with a bracket connection on the backside and having a distal end positioned in the bracket slot on the front panel such that the second part can rotate from a vertical closed position to an open position while remaining connected to the first part.

2. The user interface of claim 1 further comprising a circuit board, a CPU, and memory in electrical communication with each other and mounted within the box portion of the first part.

3. The user interface of claim 2 further comprising a removable electrical connection between the first part and the second part that provides power to the second part.

4. The user interface of claim 1 wherein the removable electrical connection comprises a ribbon connector.

5. The user interface of claim 1 wherein the box portion further comprises an Ethernet connection and the second part comprises a USB connection,
   wherein the Ethernet and USB connections are in electrical communication with the CPU.

6. The user interface of claim 1 further comprising a display connected to the front side of the second part and accessible by an operator.

7. The user interface of claim 4 wherein the display comprises a touch screen.

8. The user interface of claim 1 wherein the removable connection comprises a snap fit, compression fit, or friction fit connector that allows the proximal end of the swing bracket to be disengaged from the backside of the second part without the use of hand tools.

9. The user interface of claim 1 wherein the bracket slot comprises a lower narrow open portion and an upper wider open portion that allows the distal end of the swing bracket to be removed from the slot when the second part is lifted vertically relative to the first part.

10. The user interface of claim 1 wherein the box portion is removably connected to the front panel of the first part.

11. The user interface of claim 1 wherein the first and second parts are connected by one or more locks that maintain the second part in the closed position.

12. The user interface of claim 11 wherein the second part comprises two removable end caps that cover the one or more locks.

13. The user interface of claim 1 wherein the distal end is positioned in the bracket slot on the front panel such that the second part can rotate at least 90 degrees from the vertical closed position to the open position while remaining connected to the first part.

14. A combination of an electrical enclosure and a user interface, comprising:
   a transfer switch contained within the electrical enclosure, wherein the electrical enclosure comprises a flat front panel with a front surface, a back surface and a cutout;
   a user interface mounted to the back surface of the front flat panel and aligned with the cutout, wherein the user interface is in electrical communication with the transfer switch and powered with DC voltage, the user interface comprises,
   a first part having a box defined by a rear side, a front panel and four sides, where the front panel has a bracket slot and flange surfaces containing mounting connectors engaged with the front flat panel of the electrical enclosure such that only the front panel of the first part is visible and accessible to an operator of the user interface;
   a second part removably connected to the first part, where the second part has a front side and a backside, the backside has a swing bracket having a proximal end removably engaged with a bracket connection to the backside and having a distal end positioned in the bracket slot on the front panel such that the second part can rotate from a vertical closed position to an open position while remaining connected to the first part.

15. The combination of claim 14 further comprising a circuit board, a CPU, and memory in electrical communication with each other and positioned within the box.

16. The combination of claim 14 further comprising a removable electrical connection between the first part and the second part that provides power to the second part.

17. The combination of claim 14 further comprising a display operably connected to the front side of the second part and accessible by an operator.

18. The combination of claim 17 wherein the display on the user interface can be replaced without opening the electrical enclosure or disconnecting power to the transfer switch.

19. The combination of claim 14 wherein the distal end is positioned in the bracket slot on the front panel such that the second part can rotate at least 90 degrees from the vertical dosed position to the open position while remaining connected to the first part.

\* \* \* \* \*